United States Patent [19]

Okawara

[11] 3,720,004
[45] March 13, 1973

[54] ROTARY DRIER FOR SLUDGE
[75] Inventor: Daiji Okawara, Shizuoka, Japan
[73] Assignee: Kabushiki Kaisha Okawara Seisakusho, Kando, Yoshdacho, Haibara-gun, Shizuoka-ken, Japan
[22] Filed: Nov. 30, 1971
[21] Appl. No.: 203,264

[30] Foreign Application Priority Data

Oct. 15, 1971 Japan ............................. 46/81503

[52] U.S. Cl. ..................... 34/130, 110/14, 34/168, 263/33, 263/34
[51] Int. Cl. ........................... F23b 1/32, F23g 5/06
[58] Field of Search ..... 34/130, 168; 110/14; 263/33, 263/34

[56] References Cited

UNITED STATES PATENTS

| | | | |
|---|---|---|---|
| 2,971,265 | 2/1961 | Young | 263/33 R |
| 2,898,099 | 8/1959 | DeCoriolis | 263/34 |
| 2,743,918 | 5/1956 | Struckmann | 263/33 |
| 3,443,909 | 5/1969 | Goossens | 263/34 |
| 3,211,439 | 10/1965 | Fahlberg | 263/19 A |

Primary Examiner—John J. Camby
Assistant Examiner—Henry C. Yuen
Attorney—James E. Armstrong et al.

[57] ABSTRACT

In a rotary drier for drying sludge by drying gas within a drum during travel of said sludge from one end to the other end of said drum, a deflector is provided in the proximity of a drying gas inlet to deflect the flow direction of drying gas so that the drying gas may flow evenly within the drum, and further stirring members and blade members are mounted on a rotary shaft extending through the drum so that the sludge charged into the drum may be broken and stirred and the drying gas may be caused to swirl to form turbulent flows by said stirring members and the velocity of the drying gas flowing toward an outlet of the drum may be lowered and the concentration of the sludge particles residing in the drum may be increased by said blade members.

4 Claims, 4 Drawing Figures

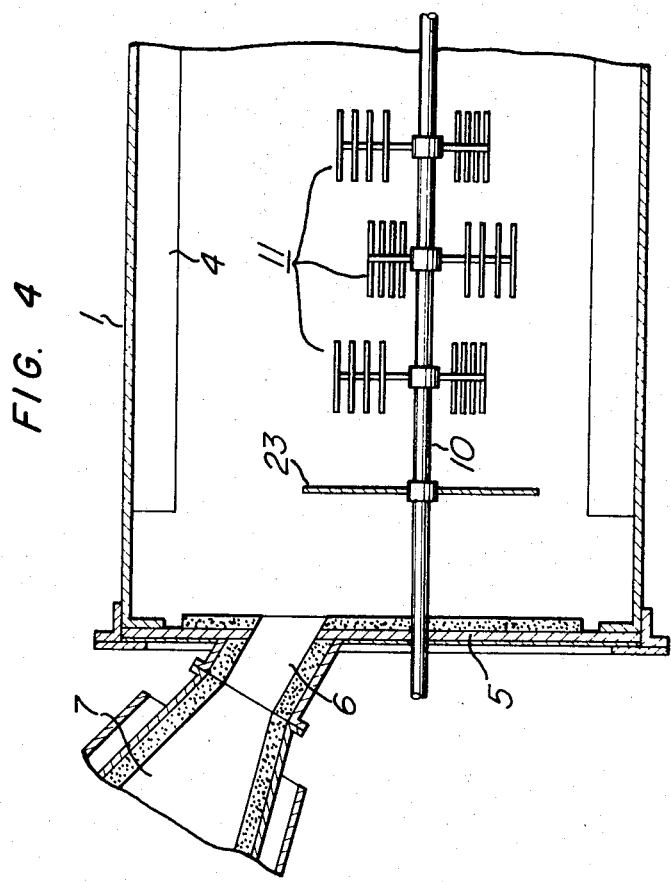

ROTARY DRIER FOR SLUDGE

This invention relates to a rotary drier adapted for use in the drying of sludge.

In conventional rotary driers of the type described, use has been made of a chain or the like to uniformly distribute sludge within a rotary drum which tends to attach onto the inner surface of the rotary drum or form an aggregate mass at the bottom of the rotary drum particularly when said sludge is hard to dry. With such a construction, it is almost impossible to break the aggregate mass of sludge and the sludge is dried as aggregated for a relatively long period of time, so that there has been the disadvantage that the drying efficiency is low and the aggregate mass of sludge is discharged from the drier with the surface only dried and with the interior thereof incompletely dried, as a product. Furthermore, since the drying gas passes through the drum not evenly, the drying efficiency has been low and unevenness has tended to occur in the dryness of the product.

In order to obviate the above-described disadvantages of the conventional driers, in the present invention stirring members are mounted on a rotary shaft extending through the drum so as to break the sludge charged into the drum in the proximity of a sludge inlet, and a deflector is provided adjacent a drying gas inlet to deflect the flow direction of drying gas so that the drying gas may flow evenly within the drum to heat the inner wall of the drum and thereby to minimize the sludge attaching to said inner wall, and further the drying gas is caused to swirl by said stirring members to form turbulent flows so that the sludge may be dried efficiently even when said sludge is hard to dry.

The conventional driers also had the disadvantage that, since the incompletely dried sludge particles are discharged from the drum while being entrained in the drying gas, the concentration of the particles residing within the drum becomes low or the average residence time of the particles in the drum becomes short. In the present invention, blade members are provided adjacent the rear end of the drum, whereby the sludge particles are prevented from being discharged to the outside of the drum while being entrained in the drying gas and thereby the concentration of the sludge particles residing within the drum is increased or the average residence time of the particles in the drum is prolonged, to enhance the drying efficiency.

It is, therefore, the object of the invention to provide a rotary drier which is capable of drying a hard-to-dry sludge with high efficiency and is simple in construction.

According to the present invention there is provided a rotary drier for sludge, comprising a drum having a sludge inlet and a drying gas inlet at one end and a drying gas and product outlet at the other end thereof, and rotatably mounted on a mounting base; elongate louver boards provided substantially axially on the inner surface of said drum for carrying the sludge upwardly incident to rotation of said drum; a deflector provided in said drum close to and in confronting relation with said drying gas inlet for deflecting the flow direction of the drying gas supplied from said drying gas inlet into said drum and thereby to distribute the drying gas evenly within the drum; a rotary shaft extending through said drum along an axis adjacent to the axis of said drum; stirring members mounted on said rotary shaft over the length thereof except for a portion close to said outlet and adapted to break and stir the sludge charged into the drum incident to rotation of said rotary shaft; blade members mounted on said rotary shaft adjacent said outlet and adapted to lower the velocity of the drying gas flowing within said drum toward said outlet incident to rotation of said rotary shaft; driving means for rotating said drum and driving means for rotating said rotary shaft.

The accompanying drawings show an embodiment of the rotary drier, according to the present invention, in which FIG. 1 is a front elevational view, partially broken away and partially shown in section, of the rotary drier;

FIG. 4 is a fragmentary vertical sectional view, partially in elevation, showing a disc mounted on the rotary shaft for deflecting the flow direction of drying gas supplied into the drum.

Figure 1:
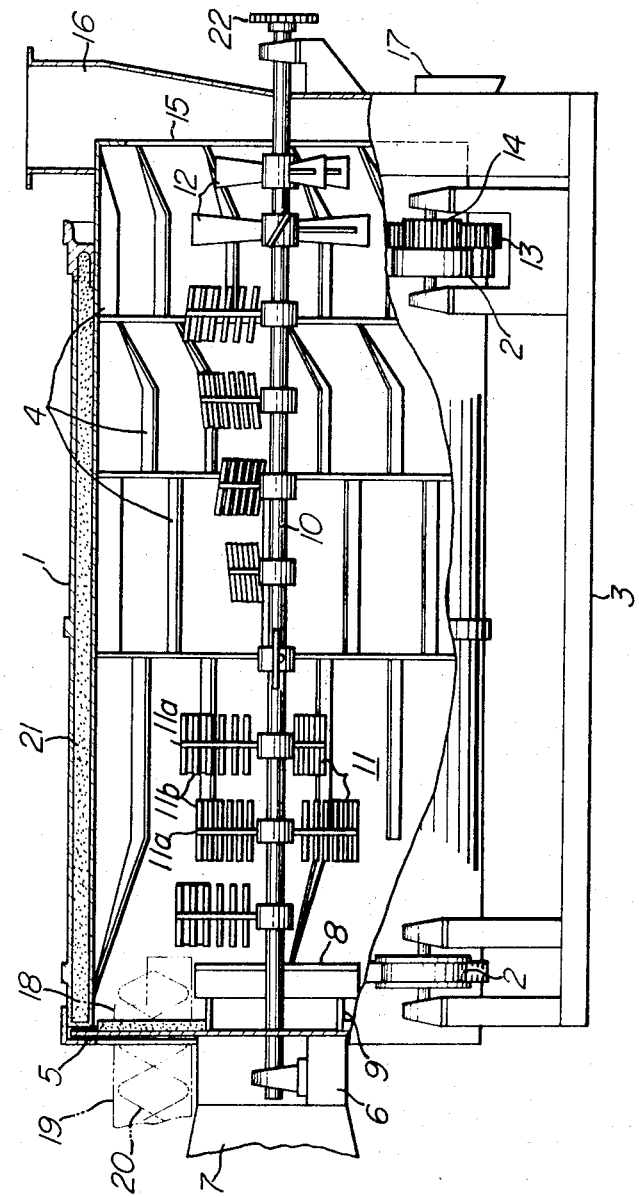
Figure 2:
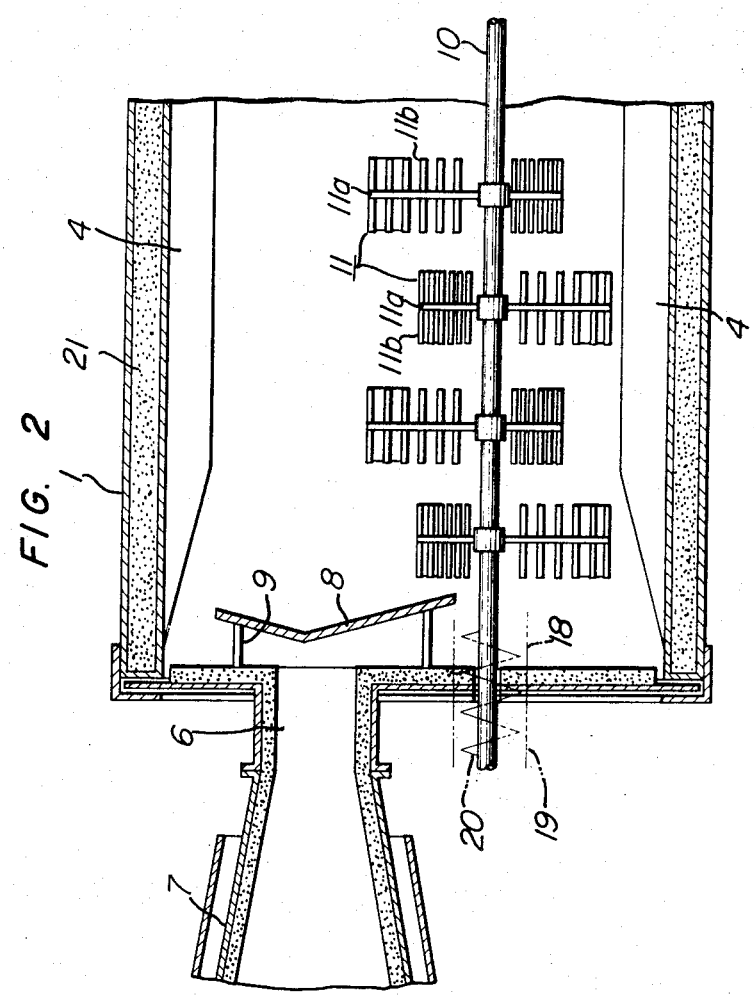
FIG. 2 is a fragmentary horizontal sectional view, partially in elevation, of the inlet side of the drier shown in FIG. 1.
Figure 3:
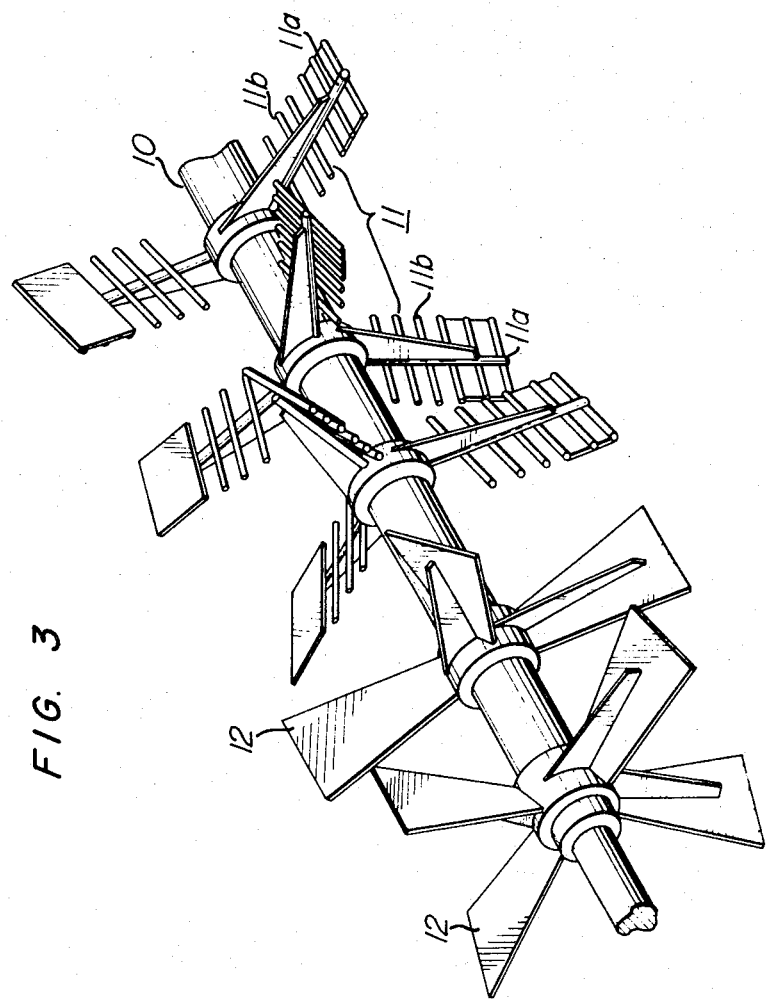
FIG. 3 is a perspective view of the stirring members and the blade members mounted on the rotary shaft in the proximity of the outlet of the drier shown in FIG. 1.

Now, a preferred embodiment of the invention will be described with reference to the drawings. Referring to the drawings and particularly to FIG. 1, a drum 1 having the outer peripheral surface lined with a heat insulating material 21 is rotatably horizontally supported on a mounting base 3 by means of rollers 2. The drum 1 has louver boards 4 substantially axially connected to the inner peripheral surface thereof. An end plate 5 on the inlet side of the drum 1 is provided with a drying gas inlet 6 centrally thereof which communicates with a drying gas generator 7. Inside of the drying gas inlet 6 is provided a deflector 8 in confronting relation with said inlet, which is secured to the end plate 5 by means of a fitting 9 and by which the flow direction of the drying gas introduced into the drum from said inlet 6 is deflected so that the drying gas may be evenly distributed within the drum. A rotary shaft 10 extends axially through the center of the drum 1 and fork-like stirring members 11 are mounted on the rotary shaft 10 over the length thereof except for the rear portion, said stirring members each consisting of a vertical or radial rod 11a and horizontal or lateral rods 11b connected to said vertical rod 11a. These stirring members 11 may be mounted such that the lateral rods 11b of the respective stirring members are arranged helically with respect to the rotary shaft 10, so as to provide a fan effect capable of decreasing the velocity of the drying gas passing in the drum. In the embodiment shown, the stirring members adjacent an outlet 15 to be described later are arranged as described above. On the rear portion of the rotary shaft 10 are mounted blade members 12 to constitute an impeller, which are also arranged helically with respect to said rotary shaft so as to decrease the velocity of the drying gas passing in the drum and thereby to lengthen the residence time of the sludge within the drum. A gear ring 13 is fixedly mounted on the outer surface of the drum 1. This gear ring 13 is in meshing engagement with a pinion 14 which is driven from an electric motor not shown. An exhaust funnel 16 is connected to the outlet side of the drum to cover the outlet 15 of the drum and a dried product discharge chute 17 is provided at the lower portion of said exhaust funnel. The end plate 5 is also provided with a sludge inlet 18 and a trough 19 having a sludge feed screw 20 thereon is connected with said sludge inlet 18. The rear end of the rotary shaft 10 has a sprocket 22 mounted thereon which is driven from an electric motor, not shown, through a chain.

In the operation of the rotary drier constructed as described above, the drying gas generated by the gas generator 7 and introduced into the drum 1 from the drying gas inlet 6 is deflected by the deflector 8 radially of the drum and dispersed in the interior of said drum, and then stirred by the rotating stirring members 11. Thus, the drying gas flows in the drum substantially uniformly at every portion of the interior of said drum while swirling. When a sludge is charged into the drum 1 from the sludge inlet 18 under such condition, it is carried upwardly by the louver boards 4 and falls down from the the top to the bottom of the drum. In this case, the aggregate sludge masses are broken and scattered within the drum by the stirring members 11 and effectively brought into contact with the drying gas. The sludge reaching the bottom of the drum is again carried upwardly by the louver boards 4. This operation is repeated, whereby the sludge is gradually dried. By the time when the sludge reaches the mid portion of the drum 1, small particles of the incompletely dried sludge are formed which are suspended within the drum, and the so-called short pass phenomenon occurs in which the suspending small particles of sludge project into the exhaust funnel 16 by being entrained in the drying gas. However, the blade members 12 are rotating with the rotary shaft 10 in the rear portion of the drum 1, which decreases the velocity of the drying gas flowing toward the outlet 15 of the drum 1 to lengthen the residence time of the sludge within the drum 1, though not preventing the discharge of the gas, so that the concentration of the sludge particles residing within the drum 1 increases and hence the drying efficiency is enhanced. The blade members 12 also serve to prevent the aforesaid short pass phenomenon by repelling the small particles of sludge backward which are colliding against the surfaces of said blade members in their movement toward the exhaust funnel 16. The stirring members 11 located adjacent the outlet 15 also provide a fan effect and serve to extend the average passage time of the sludge in the drum 1 by reducing the velocity of the drying gas flowing toward the outlet 15. By the above described functions of the blade members 12 and the stirring members 11, the small particles of sludge are retained within the drum 1 for a period of time long enough to be completely dried. The resultant particles of uniform size are discharged to the outside of the drum from the outlet 15 through the exhaust funnel 16 and the chute 17.

In addition to the function described above, the blade members 12 has a function of stirring the drying gas in the rear end portion of the drum 1 to exchange the gas passing in the upper portion and lower portion of the drum with each other and thereby to provide a uniform temperature distribution within the drum 1.

FIG. 4 shows another form of the deflector 8 which consists of a disc 23 mounted on the rotary shaft 10 close to and in confronting relation with the drying gas inlet 6 and rotated by said rotary shaft. It will be obviously understood that the disc 23 serves the same purpose as that of the deflector 8 described previously.

In the rotary drier of the present invention, as described above, the sludge charged into the drum is dispersed within the drum by the rotation of said drum and the stirring members, and dried in that state by the swirling turbulent flow of drying gas during its travel from one end to the other end of the drum. Therefore, even a sludge which is hard to dry can be dried continuously automatically and yet with high efficiency.

Particularly, in the rotary drier of the invention, the sludge is uniformly dispersed within the drum by being stirred and broken by the stirring members when the sludge carried upwardly by the louver boards falls down to the bottom of the drum and the drying gas is caused to flow spirally within the drum by said stirring members, so that effective contact between the sludge and the drying gas can be obtained and uniform drying of the sludge can be achieved very efficiently, and hence the operational cost can be greatly reduced. In addition, since the deflector is provided in the drum adjacent the drying gas inlet to deflect the flow direction of the gas, the drying gas can be distributed uniformly within the drum and the dead angle of the gas otherwise occurring on the inlet side of the drum can be eliminated. Furthermore, since the blade members are provided in the rear end portion of the drum to prevent the small particles of sludge from being discharged to the outside of the drum by being entrained in the drying gas flow, the concentration of the sludge within the drum can be increased and the residence time of the sludge particles within the drum can be lengthened. Consequently, the volume of the drier can be reduced and hence the production cost and the installation space can be greatly decreased.

What is claimed is:

1. A rotary drier for sludge, comprising a drum having a sludge inlet and a drying gas inlet at one end and a drying gas and product outlet at the other end thereof, and rotatably mounted on a mounting base; elongate louver boards provided substantially axially on the inner surface of said drum for carrying the sludge upwardly incident to rotation of said drum; a deflector provided in said drum close to and in confronting relation with said drying gas inlet for deflecting the flow direction of the drying gas supplied from said drying gas inlet into said drum and thereby to distribute the drying gas evenly within the drum; a rotary shaft extending through said drum along an axis adjacent to the axis of said drum; stirring members mounted on said rotary shaft over the length thereof except for a portion close to said outlet and adapted to break and stir the sludge charged into the drum incident to rotation of said rotary shaft; blade members mounted on said rotary shaft adjacent said outlet and adapted to lower the velocity of the drying gas flowing within said drum toward said outlet incident to rotation of said rotary shaft; driving means for rotating said drum and driving means for rotating said rotary shaft.

2. A rotary drier for sludge, according to claim 1, wherein said deflector is a disc mounted on said rotary shaft.

3. A rotary drier for sludge, according to claim 1, wherein the lateral rods of those of said stirring members which are located in the proximity of said outlet are arranged helically with respect to said rotary shaft, so that the velocity of the drying gas flowing toward said outlet may be decreased by the rotation of said stirring members.

4. A rotary drier for sludge, according to claim 1, wherein the blades of said blade members are arranged helically with respect to said rotary shaft.

* * * * *